3,051,689
PROCESS FOR THE TRIALKYLBORON CATALYZED POLYMERIZATION OF VINYL MONOMERS
Nathan L. Zutty, Charleston, W. Va., assignor to Union Carbide Corporation, a corporation of New York
No Drawing. Filed Apr. 25, 1960, Ser. No. 24,248
4 Claims. (Cl. 260—87.5)

The present invention is concerned with the polymerization of vinyl monomers. In particular, the invention is concerned with an improvement in the trialkylboron catalyzed polymerizations of vinyl chloride and of mixtures of vinyl chloride and ethylene when carried out in the presence of an aqueous diluent.

Heretofore, it has been known that polyvinyl chloride and copolymers of vinyl chloride can be produced by aqueous polymerization techniques using trialkylboron catalysts. Unlike similar procedures involving the use of other conventional free radical-producing catalysts such as peroxides, aqueous polymerizations conducted using trialkylboron catalysts can be carried out efficiently even at temperatures substantially below room temperature. Trialkylborons are also desirable because they are relatively more stable catalysts. Thus, the necessity for special handling care in connection with their use is obviated. In addition, the presence of trialkylborons in the polymerization reaction mixture has not been found to have any adverse or deleterious effect upon the other components of the reaction mixture including the polymeric product.

Aqueous trialkylboron-catalyzed polymerizations of the type known to the art have generally been conducted as either suspension or emulsion polymerizations wherein the monomer or mixture of monomers undergoing polymerization is suspended in an aqueous diluent and contacted therein with a catalytic amount of a trialkylboron catalyst at a temperature and for a period of time sufficient to produce a polymeric product. To facilitate suspending the monomer(s) in the aqueous diluent, conventional suspension or emulsification agents, hereinafter referred to generically as "suspending agents" are also incorporated in the polymerization charge. Moreover, little importance has heretofore been attributed to the particular method of addition of the various components of the polymerization charge, and in conventional operation, the vinyl chloride monomer has ordinarily been introduced to the aqueous diluent and brought in contact with the suspending agent prior to the introduction of the catalyst.

Unexpectedly, it has now been found that especially high and often essentially complete or quantitative conversions of monomer to polymer can be obtained in the aqueous trialkylboron-catalyzed polymerizations only by bringing the vinyl chloride monomer and the catalyst into admixture with each other in the absence of and prior to their contact with the suspending agent. Such a process step can be effected in any convenient manner. By way of illustration, the vinyl chloride monomer and the trialkylboron catalyst can be introduced to the aqueous diluent and admixed therein prior to the introduction of the suspending agent. Alternatively, the vinyl chloride monomer and the trialkylboron catalyst can be admixed and subsequently introduced to an aqueous diluent containing a suspending agent. Thereafter, the polymerization is carried out in accordance with conventional procedure as described below. In this connection, it is to be noted that when a copolymer of vinyl chloride and ethylene is to be produced, the ethylene monomer is preferably added to the reaction mixture subsequent to the admixture of the vinyl monomer catalyst, aqueous diluent and suspending agent. However, any other suitable mode of addition for the ethylene monomer can also be utilized. Thus, for instance, the ethylene monomer can also be introduced to the reactor as a mixture with the vinyl chloride monomer, or in any other convenient manner.

The higher conversions of monomer to polymer that are realizable in accordance with the improved process of the invention can be seen, by way of illustration, from the examples described below. In each of the examples, for instance, at least a seven-fold increase in the conversion of monomer to polymer was obtained by the process of this invention as compared with conventional aqueous trialkylboron catalyzed polymerizations. Often this increase in conversion was considerably greater. Also of significant importance is the fact that conversions of monomer to polymer of up to about 90 percent by weight and higher were achieved through the practice of this invention while at best only a 10 to 13 percent conversion was obtained by conventional processes.

In addition to the substantially higher conversions of monomer to polymer that can be realized through the practice of this invention as compared with those aqueous trialkylboron-catalyzed polymerizations in which the vinyl chloride monomer and catalyst are brought into contact with each other subsequent to their contact with a suspending agent, other advantages have also been noted. For instance, the polymeric products obtained in accordance with this invention often demonstrate a higher heat distortion temperature, an improved thermal stability and a more narrow molecular weight distribution when compared with the products obtained by the conventional aqueous trialkylboron-catalyzed polymerizations hereinabove described. In particular, the improvement in thermal stability is evidenced, for example, by reduced discoloration upon heating, while the more narrow molecular weight distribution is evidenced by less of a weight loss upon extraction with a solvent such as acetone.

In its broadest aspect, the process of this invention has been found applicable to both the homopolymerization of vinyl chloride and the copolymerization thereof with ethylene. Thus, the monomer charge to the reactor can consist entirely of vinyl chloride or it can consist of both vinyl chloride and ethylene. When a copolymeric product is desired, the two monomers can be charged individually, i.e. simultaneously or consecutively, or as a mixture. Moreover, under such circumstances, the vinyl chloride monomer preferably constitutes at least about 50 percent by weight based upon the total weight of monomer charged, with particularly good results realizable when the vinyl chloride component constitutes at least about 80 percent by weight based upon the total weight of monomer charged.

Among the trialkylborons which are suitable for use as polymerization catalysts in accordance with this invention there can be mentioned the following: trimethylboron, triethylboron, tri-n-butylboron, trihexylboron, tri-2-ethylhexylboron, tridodecylboron, tricyclohexylboron and the like. The more preferred catalysts of this invention are the trialkylborons possessing alkyl radicals each containing from 2 to about 12 carbon atoms, of which tri-n-butylboron is especially preferred.

The function of the trialkylborons herein described being that of a polymerization catalyst, any catalytic amount thereof sufficient to catalyze the polymerization can be used in accordance with this invention. Most frequently, however, the trialkylboron catalyst is employed in a concentration of from about 0.03 percent to about 5 percent by weight based upon the total weight of monomer charged, with the use of a catalyst concentration of from about 0.1 percent to about 3 percent by weight based upon the total weight of monomer charged being preferred. Somewhat lower catalyst concentrations can also be employed effectively, while the upper limit of catalyst concentration is merely one of economic consideration.

The suspending agents suitable for use in accordance with this invention are the conventional agents employed in accordance with the aqueous suspension or emulsion polymerizations known to the art and include, for example: alkyl 2-ethylhexylsulfate; esters sulfonated dicarboxylic acids such as dioctyl sodium sulfosuccinate; high molecular weight alcohols such as lauryl alcohol; and poly(vinyl alcohol); poly(alkylene oxides) such as poly(ethylene oxide); alkylphenyl ethers of poly(ethylene oxides); cellulose ethers such as methyl cellulose and hydroxyethyl cellulose; and the like.

The amount of suspending agent employed need only be sufficient to effect the desired result, i.e. the suspension of the monomer(s) charged, and therefore can be varied broadly in the practice of this invention. Ordinarily, however, from about 1 to about 3 percent by weight of the suspending agent based upon the total weight of monomer charged is utilized. Greater or lesser amounts can also be employed. The aqueous diluent, serving as a suspending medium for both the reactant monomer(s) and the polymeric product can be composed essentially of water. On the other hand, substantial quantities of other organic diluents can also be present therein, and under certain circumstances, are in fact desired. For instance, when the process of this invention is to be conducted at temperatures below about 0° C., an organic solvent such as ethylene glycol or methanol can be incorporated in the aqueous diluent to prevent freezing. In other instances the organic diluents may serve as a solvent for the ethylene monomer, thereby permitting satisfactory copolymerizations at lower pressures. Still other diluents may serve as a solvent for the catalyst.

Broadly speaking, suitable organic diluents which can be incorporated with water to comprise the aqueous diluent of this invention include alcohols, ketones, saturated aliphatic and aromatic hydrocarbons, ethers, alkyl and aryl halides, nitriles, amides, esters and the like. As typical of these there can be mentioned the following: ethanol, acetone, heptane, toluene, benzene, diethyl ether, tetrahydrofuran, propylene oxide, ethylene dichloride, chlorobenzene, acetonitrile, dimethylformamide, ethyl acetate and the like. However, as noted, previously, it is not necessary that an organic diluent be present.

Moreover, it will be apparent to one skilled in the art that the amount of aqueous diluent employed can be varied broadly. In general, however, it is desirable to have at least 1 percent by weight of monomer present therein, although this restriction is again one of economic consideration. It is only necessary that the amount of water present be sufficient to serve as a suspending medium for the total charge of monomer. When an organic diluent is also employed, water nevertheless ordinarily constitutes the major component of the aqueous diluent.

The temperature at which the process of this invention can be carried out is susceptible of broad variation. The optimum temperature is dependent to a certain extent upon the monomer(s) undergoing polymerization. Thus, somewhat lower reaction temperatures can be employed efficiently for the copolymerization of vinyl chloride with substantial amounts of ethylene as compared with the homopolymerization of vinyl chloride. Generally, however, the process of the invention is carried out at a temperature in the range of from about −30° C. to about 100° C. and preferably from about 0° C. to about 60° C., while slightly higher or lower polymerization temperatures can also be used.

The reaction pressure and period of time can also be varied broadly in accordance with the process of this invention. Thus, atmospheric or superatmospheric pressure can be employed with good results as long as there is a sufficient concentration of monomer present. The polymerization can most conveniently be conducted at the autogenous pressures created in the reaction equipment employed, up to pressures of from about 50 to about 3000 atmospheres. Moreover, the polymerization can be conducted in a continuous manner in an agitator-equipped vessel at atmospheric pressure or at elevated pressures in a tubular reactor. Alternatively, the polymerization can be conducted batchwise in a sealed autoclave or in any other convenient manner.

The reaction period can vary from as little as five minutes or less, up to several days if desired. The longer the reaction period, of course, the more complete the polymerization, i.e. conversion of monomer to polymer. In this regard, it is to be noted again that a substantially higher degree of conversion is obtained in every instance when the reaction is carried out in accordance with the process of this invention by bringing the vinyl chloride monomer and the trialkylboron catalyst into admixture in the absence of and prior to their contact with the suspending agent.

Upon completion of the polymerization, the polymeric product that is formed can be recovered by any convenient method known to those skilled in the art, such as by filtration, centrifugation, etc.

The practice of this invention and the advantages accruable thereby can be illustrated further by the following specific examples, which, it is to be noted are not intended to limit the invention. In the examples, the heat distortion temperature values are the values determined in accordance with A.S.T.M. method DC48–45T. The term "reduced viscosity" is well known in the polymer art and is obtained by dividing the specific viscosity of a solution of the polymer by the concentration of the polymer in the solution, the concentration being measured in grams of polymer per 100 milliliters of solvent; the specific viscosity is obtained by dividing the difference between the viscosity of the polymeric solution and the viscosity of the pure solvent by the viscosity of the solvent. The reduced viscosity of a polymer is regarded as a measure of the average molecular weight of the polymer, with higher values indicating higher average molecular weights. The concentration of polymer in solution in determining the reduced viscosities of the polymers was 0.2 gram per 100 milliliters of cyclohexanone and was measured at a temperature of 30° C.

Example 1

A 2-liter, glass-lined autoclave, equipped with a stirrer and inlet and outlet ports, was charged with 708 milliliters of distilled water, flushed with nitrogen, sealed and stirring begun. The autoclave was then charged with the following ingredients at room temperature in the order stated. Three and eight-tenths milliliters of tributylboron were introduced to the autoclave by means of a syringe. Then, 375 grams of vinyl chloride were introduced by means of a tared charging cylinder and the contents of the autoclave were thoroughly stirred. Subsequently, 8.0 milliliters of a 5 weight percent aqueous solution of dioctyl sodium sulfosuccinate were introduced to the autoclave by means of a nitrogen-pressured charging cylinder. Finally, while maintaining the temperature within the autoclave in range of from about 20° C. to about 40° C. by means of a water bath surrounding the autoclave, 19.0 grams of ethylene were introduced thereto. Stirring was continued, and after a period of about 67 hours had elapsed, the autoclave was opened. A polymeric product has been formed. This product was then filtered, washed with hot water, then with methanol, and thereafter dried overnight at a temperature of 50° C. In this manner, 325 grams (an 82 percent yield) of a copolymer of vinyl chloride and ethylene were recovered. The copolymer was found to have a specific viscosity of 1.23 and contained about 2 weight percent of ethylene copolymerized therein.

For comparison, a similar experiment was conducted in which the polymerization conditions were essentially identical to those described above save in the manner of addition of the various components of the polymerization charge. In this experiment a nitrogen-purged autoclave was first charged with 780 grams of distilled water. Then, 8.0 milliliters of a 5 weight percent aqueous solution of dioctyl sodium sulfosuccinate, and subsequently 3.8 milliliters of tributylboron were charged to the autoclave. The autoclave was sealed and stirring begun. Finally, 373 grams of vinyl chloride and 26 grams of ethylene were charged to the autoclave. Upon completion of the polymerization and recovery of the product as described above, only 3 grams (a 0.8 percent yield) of a vinyl chloride-ethylene copolymer were obtained. The product was found to have a reduced viscosity of 1.15 and contained about 2 weight percent of ethylene copolymerized.

From these experiments, it can readily be seen that substantially higher conversions of monomer to polymer were obtained in the aqueous trialkylboron-catalyzed copolymerization of vinyl chloride and ethylene performed in accordance with the process of this invention by bringing the vinyl chloride monomer and the catalyst into admixture in the absence of and prior to their contact with the suspending agent. The reduced viscosity, ergo the average molecular weight of the product of each experiment, was essentially the same, as was the amount of copolymerized ethylene in the copolymer.

Example II

Another set of experiments was carried out to illustrate the advantages which result when operating by the process of this invention.

In run No. 1, 0.23 gram of tributylboron was initially admixed with 30 grams of vinyl chloride. This mixture was then added to a 300 milliliter pressure bottle containing 100 grams of water and 0.2 gram of methyl cellulose. The bottle was purged with nitrogen, sealed, and tumbled in a water bath at a temperature of 25° C. for a period of 18 hours. The poly(vinyl chloride) thereby produced was filtered, washed with isopropanol and dried. The yield of polymer was 10 grams, representing a 33 percent conversion of monomer to polymer.

In run No. 2, a mixture of 30 grams of vinyl chloride, 100 grams of water and 0.2 gram of methyl cellulose was prepared in the pressure bottle. Thereafter, 0.23 gram of tributylboron was added to the mixture. The polymerization was then carried out in the same manner as described above in run No. 1. The yield of poly(vinyl chloride) obtained in this manner was only 0.2 gram, representing less than a 1 percent conversion of monomer to polymer.

Thus, it can again be seen that substantially higher conversions of monomer to polymer can be realized when carrying out the polymerization in accordance with the process of this invention by bringing the vinyl chloride monomer and the catalyst into admixture in the absence of and prior to their contact with the suspending agent.

Example III

In run No. 1 of another set of experiments conducted to illustrate the advantages that accrue through the practice of this invention, 1.4 milliliters of a 21:79 solution of triethylboron in isooctane was initially admixed with 30 grams of vinyl chloride. This mixture was then added to a 300 milliliter pressure bottle containing 100 grams of water and 0.5 gram of dioctyl sodium sulfosuccinate. The bottle was purged with nitrogen, sealed, and tumbled in a water bath at a temperature of 10° C. for a period of 18 hours. The poly(vinyl chloride) thereby produced was filtered, washed with isopropanol, and dried. The yield of polymer was 21 grams, representing a 70 percent conversion of monomer to polymer.

In run No. 2 this set of experiments, a mixture of 30 grams of vinyl chloride, 100 grams of water and 0.5 gram of dioctyl sodium sulfosuccinate was prepared in the pressure bottle. Thereafter, 1.4 milliliters of a 21:79 solution of triethylboron in isooctane were added to the mixture. The polymerization was then carried out in the same manner as described above in run No. 1. The yield of poly(vinyl chloride) obtained in this manner was 3 grams, representing only a 10 percent conversion of monomer to polymer.

Thus, again it can be seen that substantially higher conversions of monomer to polymer can be realized through the practice of this invention.

Example IV

In run. No. 1 of a similar set of experiments, 0.23 gram of tributylboron was initially admixed with 30 grams of vinyl chloride. This mixture was then added to a 300 milliliter pressure bottle containing 100 grams of water and 0.5 gram of dioctyl sodium sulfosuccinate. The bottle was purged with nitrogen, sealed, and tumbled in a water bath at a temperature of 50 C. for a period of 18 hours. The poly(vinyl chloride) thereby produced was filtered, washed with isopropanol and dried. The yield of polymer was 27 grams, representing a 90 percent conversion of monomer to polymer.

In run No. 2 of this set of experiments, a mixture of 30 grams of vinyl chloride, 100 grams of water and 0.5 gram of dioctyl sodium sulfosuccinate was prepared in the pressure bottle. Thereafter, 0.23 gram of tributylboron was added to the mixture. The polymerization was then carried out in the same manner as that described above in run No. 1. The yield of poly(vinyl chloride) obtained in this manner was 3.5 grams, representing only a 13 percent conversion of monomer to polymer.

Example V

In run No. 1 of another set of experiments conducted to illustrate the advantages that accrue through the practice of this invention, 0.6 milliliter of tributylboron in 20 milliliters of isooctane was initially admixed with 30 grams of vinyl chloride. This mixture was then added to a 300 milliliter pressure bottle containing 100 milliliters of water, 1 milliliter of lauryl alcohol, 0.1 gram of methyl cellulose and 0.5 gram of dioctyl sodium sulfosuccinate. The bottle was purged with nitrogen, sealed, and tumbled in a water bath at a temperature of about 10° C. for a period of 19 hours. The poly(vinyl chloride) thereby produced was filtered, washed with isopropanol, and dried. The yield of polymer was 28 grams, representing a 93.5 percent conversion of monomer to polymer. The product had a reduced viscosity of 1.07 and a heat distortion temperature slightly above 78° C. Ten grams of the product was then extracted with 200 milliliters of acetone in a Soxhlet extractor for a period of 9 hours. The acetone extract was then precipitated with isopropanol and the precipitate filtered and dried. In this manner, only 0.2 gram of poly(vinyl chloride) was recovered. The extracted polymer had a reduced viscosity of 0.48.

In run No. 2 of this set of experiments, a mixture of 1000 grams of vinyl chloride, 1500 milliliters of a 70:30 water-ethylene glycol mixture, 15 milliliters of a polyethylene glycol nonyl phenyl ether, and 1 gram of methyl cellulose was prepared in a 4-liter flask equipped with a stirrer and condenser. Thereafter, 8 milliliters of tributylboron in 500 milliliters of isooctane was added to the mixture with stirring. The flask was then purged with nitrogen and placed in a Dry Ice bath at a temperature of about −5° C. for a period of 13 hours. The poly(vinyl chloride) product thereby produced was filtered, washed with isopropanol, and dried. The yield of polymer was 110 grams, representing only an 11 percent conversion of monomer to polymer. The product had a reduced viscosity of 1.09 and a heat distortion of only 54° C. Five grams of the polymer was then extracted with 250 milliliters of acetone in a Soxhlet extrator for a period of 6 hours and the extract recovered in the same manner as described above in run No. 1. The poly(vinyl chloride) extract thus obtained weighed 2.5 grams and had a reduced viscosity of 0.27.

From this set of experiments it can be seen that higher conversions of monomer to polymer are realizable through the practice of this invention. Moreover, while the polymer product obtained in run No. 1, conducted in accordance with this invention, had approximately the same average molecular weight as that obtained in run No. 2, viz. a reduced viscosity of 1.07 as compared with 1.09, the polymer product of run No. 1 also had a significantly and desirably higher heat distortion temperature as well as a more narrow molecular weight distribution. The latter is evidenced by the fact that the product of run No. 2 contained a much higher proportion of lower molecular weight acetone-soluble poly(vinyl chloride).

What is claimed is:

1. In the aqueous trialkylboron-catalyzed polymerization of a monomer selected from the group consisting of vinyl chloride and mixtures of vinyl chloride with ethylene wherein the polymerizable monomer is suspended in an aqueous diluent containing a suspending agent and contacted therein with a catalytic amount of a trialkylboron at a temperature of from about −30° C. to about 100° C. and for a period of time sufficient to produce a polymeric product, the improvement which comprises the step of bringing said vinyl chloride into admixture with said trialkylboron in the absence of and prior to contact thereof with said suspending agent.

2. The process according to claim 1 wherein the selected monomer is solely vinyl chloride.

3. The process according to claim 1 wherein the selected monomer is a mixture of vinyl chloride and ethylene containing at least 80 percent by weight of vinyl chloride.

4. The process according to claim 1 wherein the trialkylboron catalyst is tributylboron.

References Cited in the file of this patent

Furukawa et al.: Journal of Polymer Science, vol. 26, pages 234–6, 1957.

Ashikari: Journal of Polymer Science, vol. 28, pages 250–2, 1958.

Ashikari et al.: Journal of Polymer Science, vol. 31, pages 249–251, 1958.